United States Patent [19]

Odaka et al.

[11] Patent Number: 4,669,000

[45] Date of Patent: May 26, 1987

[54] SYNCHRONIZING CIRCUIT

[75] Inventors: Kentaro Odaka, Kawasaki; Tadashi Fukami, Yokohama; Shinya Ozaki, Fujisawa, all of Japan

[73] Assignee: Sony Corporation, Tokyo, Japan

[21] Appl. No.: 706,924

[22] PCT Filed: Jun. 13, 1984

[86] PCT No.: PCT/JP84/00307

§ 371 Date: Feb. 12, 1985

§ 102(e) Date: Feb. 12, 1985

[87] PCT Pub. No.: WO85/00066

PCT Pub. Date: Jan. 3, 1985

[30] Foreign Application Priority Data

Jun. 14, 1983 [JP] Japan .................. 58-106257

[51] Int. Cl.⁴ .................. G11B 5/09; G06F 11/10
[52] U.S. Cl. .................. 360/32; 371/37
[58] Field of Search .................. 360/32, 51; 371/47, 371/37, 38

[56] References Cited

U.S. PATENT DOCUMENTS

| | | | |
|---|---|---|---|
| 4,433,348 | 2/1984 | Stockham, Jr. et al. | 360/51 |
| 4,433,415 | 2/1984 | Kojima | 360/32 X |
| 4,433,416 | 2/1984 | Kojima | 371/38 X |
| 4,499,507 | 2/1985 | Yamada et al. | 360/51 X |
| 4,525,840 | 6/1985 | Heinz et al. | 360/51 X |

*Primary Examiner*—Raymond F. Cardillo
*Assistant Examiner*—Alyssa H. Bowler
*Attorney, Agent, or Firm*—Hill, Van Santen, Steadman & Simpson

[57] ABSTRACT

This invention relate to a synchronizing circuit for a data signal in which a data signal is divided at every predetermined number of bits, and every divided data signal is added with a synchronizing signal, an arbitrary address signal and an error detection signal for the address signal and received so as to be written in a memory in accordance with the address signal, which includes means (4) for detecting the synchronizing signal and means (3) for detecting an error of the address signal. The circuit further comprising an interpolation synchronizing signal generating circuit (6) and an interpolation address signal generating circuit (10), in which when the address signal is judged as being correct by the error detecting means (3), the interpolation synchronizing signal generating circuit (6) is driven, the interpolation address signal generating circuit (10) is driven by an interpolation synchronizing signal from the interpolation synchronizing signal generating circuit (6), and the address signal and the interpolation address signal are changed over on the basis of whether the address signal is correct or erroneous and then fed to the memory (13). According to this invention, it is possible to establish the synchronization by a circuit of a simple construction.

8 Claims, 7 Drawing Figures

SYNCHRONIZING CIRCUIT

DESCRIPTION

1. Technical Field

This invention relates to a synchronizing circuit for use with a PCM demodulating apparatus.

2. Background Art

In the prior art, an apparatus is proposed, in which a rotary head of, for example, a helical scan type is used. A recording tape is wrapped around a drum for the rotary head which has a wrap angle of 90°. PCM data of an audio signal is timebase-compressed and then recorded on the recording tape during every period in which the rotary head comes in contact with the recording tape with an angular range of 90°.

In such apparatus, since the signal is compressed in timebase upon recording and reproduced intermittently upon playback, it is very difficult to establish accurate synchronization.

On the other hand, in a special playback mode such as a playback mode with a different reproducing speed, the reproduced data is thinned out so that it becomes more difficult to establish the synchronization.

Therefore, it was considered that together with a synchronizing signal, an address signal was added to a data signal for every block including a predetermined number of bits. According to this method, upon playback, the address signal is detected to enable accurate synchronization to be obtained.

In this case, however, the address signal requires a counter-measure such as an error correction and which must also be applied to the data signal. In that case, in the prior art, an error correction code is added commonly to both of the address signal and the data signal.

However, in this method, since the error correction code is added to the entire address and data signals, it is not possible to enhance the error correction ability by interleaving only the data signal. Alternatively, to carry out the interleaving, the address signal must be also stored and this requires a memory of a large capacity.

Further, in order to judge whether the address signal is correct or erroneous, the entire one block must be checked and this requires a memory for one entire block. Furthermore, there is a problem that even when the PCM data portion is correct, if the address portion is erroneous, the entire one block signal becomes erroneous.

DISCLOSURE OF INVENTION

In view of such problems, it is an object of this invention to provide a circuit of a simple construction capable of establishing accurate synchronization.

BEST MODE FOR CARRYING OUT THE INVENTION

Figure 1:
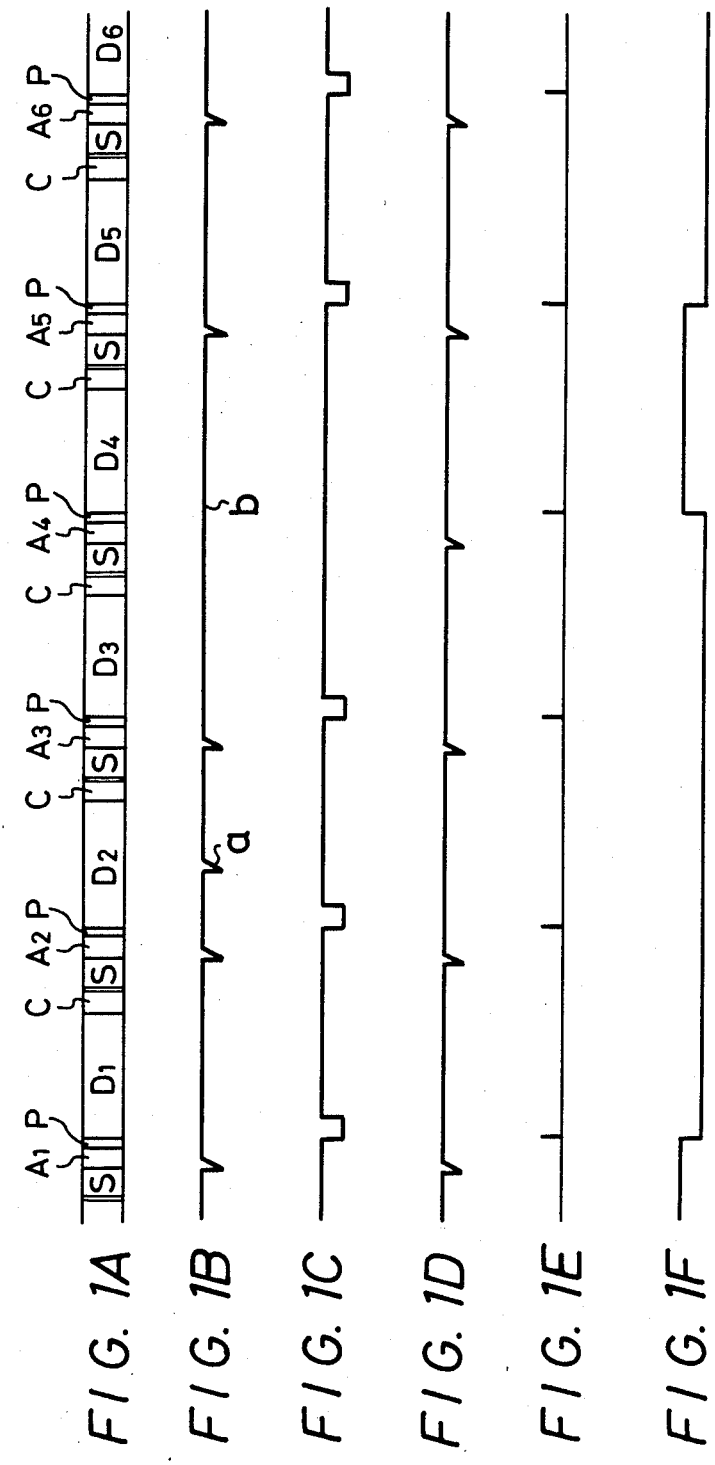
FIG. 1 is a diagram useful for explaining this invention.

FIG. 1A shows a signal to be transmitted, in which the reference letter S designates a synchronizing signal. This synchronizing signal S is followed by an address signal A, error detection bits P for the address signal A, a data signal D and an error correction code C for the data signal D for a succeeding signal. This signal is transmitted sequentially. As the synchronizing signal, there is used an inhibited pattern or the like that does not exist inherently in the data signal.

Figure 2:
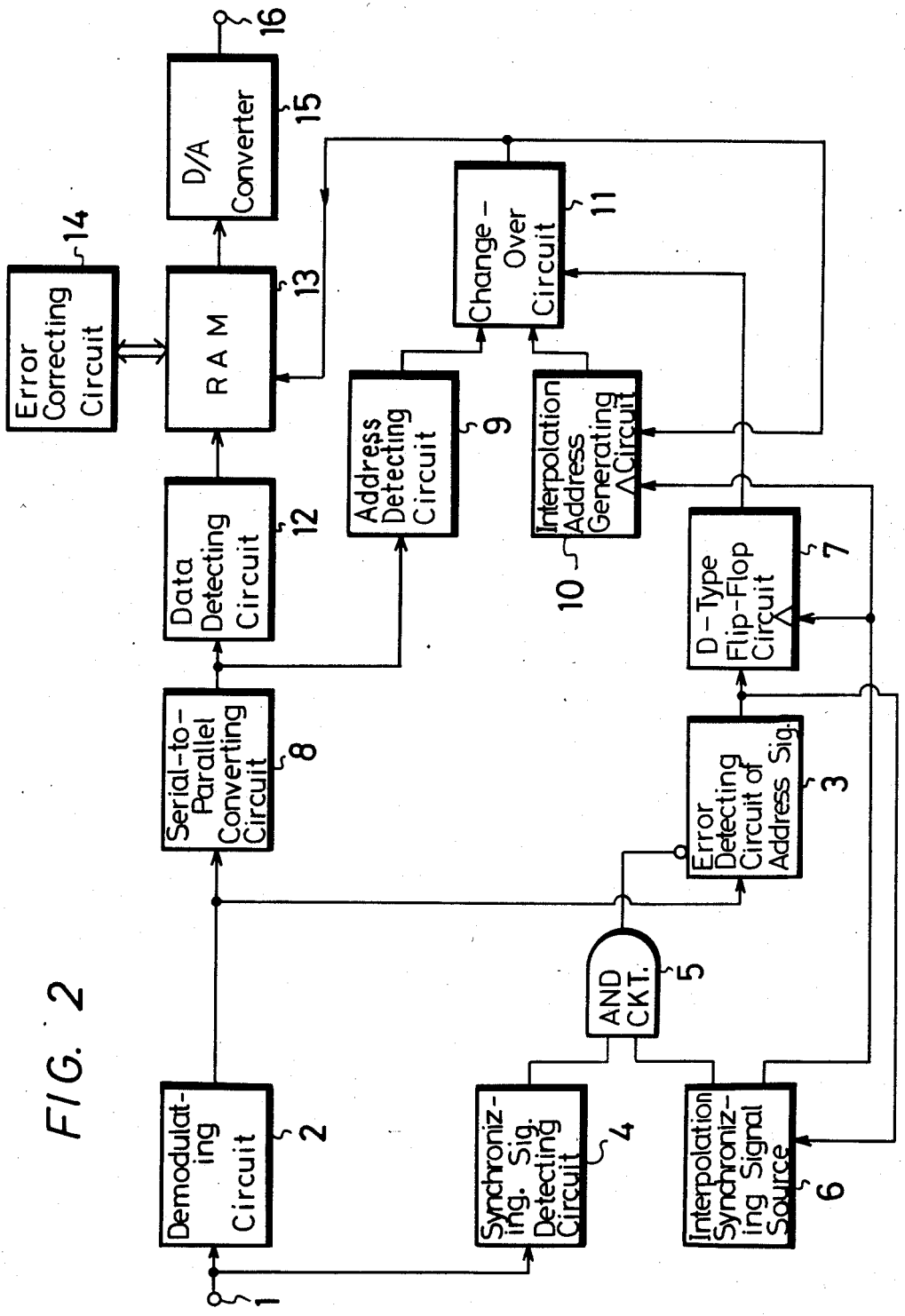
FIG. 2 is a block diagram showing an embodiment of this invention.

FIG. 2 is a block diagram of a reproducing apparatus including the synchronizing circuit, in which the above-mentioned signal is supplied to an input terminal 1 as an RF signal that is modulated in, for example, NRZ-coding. This signal is supplied to a demodulating circuit 2 and demodulated to a code signal having levels of "1" and "0". This code signal is supplied to an error detecting circuit 3 for the address signal.

The RF signal from the input terminal 1 is also supplied to a synchronizing signal detecting circuit 4. In this case, since the above inhibited pattern or the like is employed, the synchronizing signal S can be directly detected from the RF signal as, for example, shown in FIG. 1B. This synchronizing signal S is supplied through an AND circuit 5 to the reset terminal of the detecting circuit 3. This detecting circuit 3 uses the address signal A and the error detecting bits P to judge whether the address signal is correct or erroneous and then produces a signal which becomes low level when the address signal is correct, as shown in FIG. 1C.

This signal is supplied to an interpolation synchronizing signal source 6 which then produces an interpolation synchronizing signal as shown in FIG. 1D. This signal therefrom is supplied to the AND circuit 5. The sync signal so produced is timed with the output of error detecting circuit of the address signal means 3. The form of the sync signal is of course, known and only the timing of the sync signal is required to produce a correct sync signal. Further, this interpolation synchronizing signal source 6 produces a clock signal at timing just after the detection bits P as shown in FIG. 1E.

Further, the signal from the detecting circuit 3 is supplied to a D-terminal of a D-type flip-flop circuit 7 and the clock signal from the signal source 6 is supplied to its clock terminal, thus a signal as shown in FIG. 1F being produced therefrom.

The code signal from the demodulating circuit 2 is also supplied to a serial-to-parallel converting circuit 8 and the address signal A in the converted signal therefrom is supplied to an address detecting circuit 9. The clock signal from the signal source 6 is supplied to an interpolation address signal generating circuit 10 which then produces an interpolation address signal. The address signal thus detected and the interpolation address signal are both supplied to a change-over circuit 11, from which when the signal from the flip-flop circuit 7 is low in level, the address signal from the detecting circuit 9 is derived, while when it is high in level, the interpolation address signal from the generating circuit 10 is derived. The address signal thus derived is supplied to the interpolation address generating circuit 10. Thus, the output of change over circuit 11 keys the interpolation address 6 generating circuit 10 to produce the correct address.

The data signal D and the error correction code C portion of the signal from the serial-to-parallel converter 8 is supplied to a data detecting circuit 12. The data signal D and the error correction code C are supplied to a random-access memory 13 and the address signal from the above change-over circuit 11 is supplied to the memory 13, in which the writing is carried out on the basis of this address signal. The signal written in the memory 13 is corrected for error by an error correcting circuit 14. The signal is then read out at a predetermined timing, and converted to an analog signal by a D/A converter 15 and then developed at an output terminal 16.

The playback is carried out in this way. According to this apparatus, since the address signal A and the error detection bits P are provided just after the synchronizing signal S and whether the signal is correct or erroneous is detected, even if the synchronizing signal is erroneously detected due to an error in the detection of the data signal D as shown by, for example, a in FIG. 1B, such synchronizing signal is removed due to the fact that the portion thereof corresponding to the address signal is erroneous. Further, since the interpolation synchronizing signal source 6 is provided, when the synchronizing signal S is not detected due to an error as shown by b in FIG. 1B, the synchronizing signal is interpolated. Furthermore, since the interpolation address signal generating circuit 10 is provided, this address signal A is interpolated so that if only the synchronizing signal S and the address signal A are erroneous, the data signal D can be utilized, since, it is possible to detect the synchronizing signal S very accurately.

In this case, moreover, since the error detecting bits P are provided immediately after the address signal A, it be sufficient that the memory for the error detection is very small in capacity.

In the prior art, when error detection of the address signal is not carried out, since data is written in a wrong address due to an erroneous address and the correct data is destroyed, it is seen that error rate will become worse and be twice that of the original error rate. However, according to this apparatus, since there are provided detection bits of n bits, it is possible to stop the deterioration of the error rate to a value expressed as $$1 + 1/(2^n - 1)$$

For example, if n=4, the deterioration of the error rate can be stopped so that it is not higher than 7%.

During playback mode with a different reproducing speed, when the calculation matching of the speed is carried out by the interpolation address generating circuit 10 or malfunctions writing stop signal is formed thereby, the mal-function can be prevented during playback mode at a different reproduction speed.

We claim:

1. A synchronizing circuit for reproduced data signals which are divided at every predetermined number of bits, and every divided data signal is added with a synchronizing signal, an address signal and an error detection signal for said address signal so as to be transmitted via a transmitting medium, the circuit comprising: an input terminal for receiving said transmitted data; means for detecting said synchronizing signal from said transmitted data; means for detecting said address signal from said transmitted data; means for detecting an error or errors of said address signal by utilizing said error detection signal; means for generating a detecting signal indicating first and second states when said address signal is judged as being correct or erroneous by said means for detecting an error of said address signal, and means for gating said synchronizing signal with said detecting signal indicating said first state when said address signal is judged as being correct, and further comprising: memory means for storing said reproduced and transmitted data from said input terminal; means for generating an interpolation address signal; means for selectively providing said address signal and said interpolation address signal to said memory means on the basis of whether said detecting signal indicates said first state or second state.

2. A synchronizing circuit according to claim 1 further comprising: means for generating a second synchronizing signal; wherein said means for gating said synchronizing signal is provided with said synchronizing signal and said second synchronizing signal, and said means for gating said synchronizing signal is controlled by the output of said means for detecting an error or errors of said address signal.

3. A synchronizing circuit according to claim 2 further comprising means for controlling said means for selectively providing said address signal and said interpolation address signal.

4. A synchronizing circuit according to claim 1 wherein said data signal is a pulse code modulated audio signal.

5. A synchronizing circuit according to claim 1 wherein said data is recorded and reproduced by a rotary head of a helical scan type.

6. A synchronizing circuit according to claim 1, wherein said data signal is time base compressed and recorded and reproduced intermittently.

7. A synchronizing circuit for reproduced data signals which are divided at every predetermined number of bits, and every divided data signal is added with a synchronizing signal, an address signal and an error detection signal for said address signal all of which are transmitted via a transmitting medium, the circuit comprising: an input terminal for receiving said transmitted data; memory means for storing said reproduced and transmitted data from said input terminal; means for detecting said synchronizing signal from said transmitted data; means for detecting said address signal from said transmitted data; means for detecting an error or errors of said address signal by utilizing said error detection signal and for generating a detecting signal indicating first and second states when said address signal is judged as being correct or erroneous, respectively; means controlled by the detecting signal of said means for detecting an error or errors of said address signal and for generating an internal synchronizing signal; means for gating said synchronizing signal with said internal synchronizing signal; means for generating an interpolation address signal; means for selectively providing said address signal and said interpolation address signal to said memory means; and means for controlling said means for selectively providing said address signal and said interpolation address signals, on the basis of whether said detecting signal indicates said first state or second state.

8. A synchronizing circuit for reproduced data signals which are divided at every predetermined number of bits, and every divided data signal is added with a synchronizing signal, an address signal and an error detection signal for said address signal all of which are transmitted via a transmitting medium, the circuit comprising: an input terminal for receiving said transmitted data; memory means for storing said reproduced and transmitted data from said input terminal; means for detecting said synchronizing signal from said transmitted data; means for detecting said address signal from said transmitted data; means for detecting an error or errors of said address signal by utilizing said error detection signal and for generating a detecting signal indicating first and second states when said address signal is judged as being correct or erroneous, respectively; means controlled by the detecting signal of said means for detecting an error or errors of said address signal and for generating an internal synchronizing signal; means for driving a means for detecting an error or errors of said address signal with said internal synchronizing signal; means for generating an interpolation address signal; means for selectively providing said address signal and said interpolation address signal to said memory means; and means for controlling said means for selectively providing said address signal and said interpolation address signal, on the basis of whether said detecting signal indicates said first state or second state.

* * * * *